L. C. LOMER.
COFFEE-POT.
No. 172,462. Patented Jan. 18, 1876.
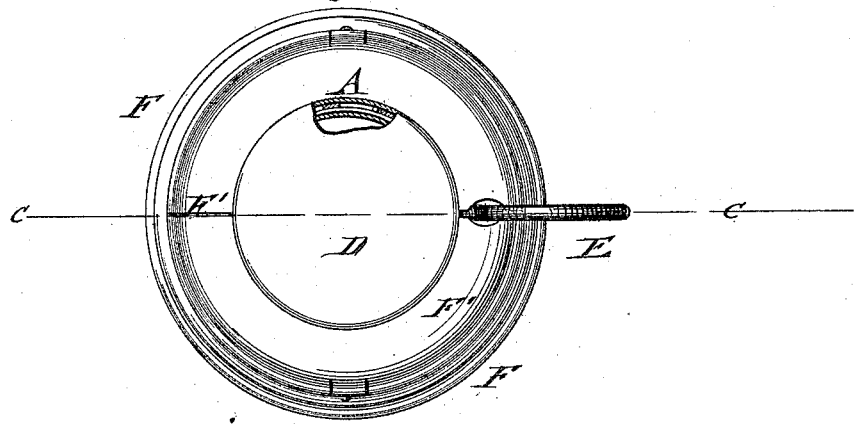
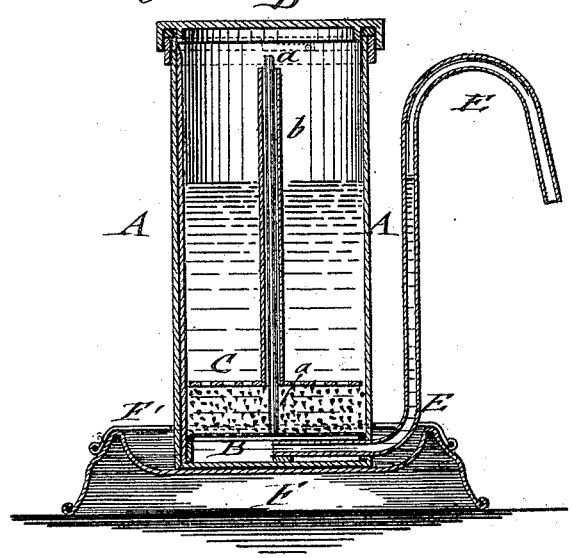

UNITED STATES PATENT OFFICE.

LOUIS C. LOMER, OF NEW YORK, N. Y.

IMPROVEMENT IN COFFEE-POTS.

Specification forming part of Letters Patent No. 172,462, dated January 18, 1876; application filed December 20, 1875.

*To all whom it may concern:*

Be it known that I, LOUIS C. LOMER, of the city, county, and State of New York, have invented a new and Improved Coffee-Pot, of which the following is a specification:

The invention is an improvement in coffee-machines, in which the liquid-holding vessel (provided with an internal arrangement of strainers and a discharge-pipe leading from the bottom thereof) is supported in or upon a detachable stand or pedestal. The improvement relates particularly to the construction of the stand or pedestal, as hereinafter described and claimed.

In the drawing, A indicates the coffee-holding vessel provided with cover D. B is the bottom strainer, and C the top strainer, provided with a tube, $b$, which is slipped over the rod $a$, attached to part B. The liquid coffee is discharged through tube E when sufficient steam has been formed in the upper portion of the vessel A to force the water down through the ground coffee placed between parts B C. The stand or pedestal F, upon which the vessel A is placed, has a concave top for receiving the alcohol, which, on being lighted, flames up around said vessel, and quickly heats the water contained therein. The stand F has semicircular hinged covers F′, which are separately hinged at opposite sides of the stand. These covers are left open while the alcohol is burning, and closed to extinguish the flame, and prevent, so far as practicable, evaporation of the alcohol. Each cover F′ has a notch in one of its ends to adapt it to fit around the tube E.

What I claim is—

The stand for coffee machines or pots, having the top concavity and the hinged semicircular covers F′, as shown and described.

LOUIS C. LOMER.

Witnesses:
T. B. MOSHER,
PAUL GOEPEL.